US009830331B2

(12) United States Patent
Govind (10) Patent No.: US 9,830,331 B2
(45) Date of Patent: Nov. 28, 2017

(54) CLUSTER SCALE SYNCHRONIZATION OF PRODUCER CONSUMER FILE ACCESS VIA MULTI-PROTOCOL NODES

(71) Applicant: NetApp, Inc., Sunnyvale, CA (US)

(72) Inventor: Subin Govind, San Jose, CA (US)

(73) Assignee: NetApp, Inc., Sunnyvale, CA (US)

( * ) Notice: Subject to any disclaimer, the term of this patent is extended or adjusted under 35 U.S.C. 154(b) by 403 days.

(21) Appl. No.: 14/703,745

(22) Filed: May 4, 2015

(65) Prior Publication Data
US 2016/0328436 A1 Nov. 10, 2016

(51) Int. Cl.
*G06F 17/30* (2006.01)
*H04L 29/08* (2006.01)

(52) U.S. Cl.
CPC .... *G06F 17/30168* (2013.01); *H04L 67/1095* (2013.01)

(58) Field of Classification Search
CPC .............. G06F 17/30168; H04L 67/1095
See application file for complete search history.

(56) References Cited

U.S. PATENT DOCUMENTS

| 5,956,712 | A | 9/1999 | Bennett et al. | |
|---|---|---|---|---|
| 5,987,506 | A * | 11/1999 | Carter ................... | G06F 9/5016 707/999.01 |
| 9,213,717 | B1 * | 12/2015 | Pawar ............... | G06F 17/30171 |
| 2015/0370827 | A1 * | 12/2015 | Parkison ........... | G06F 17/30215 707/626 |

OTHER PUBLICATIONS

Schmuck, GPFS: A Shared-Disk File System for Large Computing Clusters, Proceedings of the Conference on File and Storage Technologies, Jan. 2002, 14 pages.*
Benjamin, "OpenAFS Byte-Range Locking", retrieved from http://workshop.openafs.org/afsbpw07/talks/matt.pdf, 2007, 25 pages.
Eisler, et al., "Data ONTAP GX: A Scalable Storage Cluster", FAST '07 Proceedings of the 5th USENIX conference on File and Storage Technologies, 2007, 139-152.
Linux Wiki, "Cluster Coherent NFS and Byte Range Locking", Retrieved from "http://wiki.linuxnfs.org/wiki/index.php/Cluster_Coherent_NFS_and_Byte_Range_Locking", Oct. 11, 2006, 1-5.

* cited by examiner

*Primary Examiner* — Albert Phillips, III
(74) *Attorney, Agent, or Firm* — LeClairRyan, a Professional Corporation (57) ABSTRACT

In a storage cluster, a producer and a consumer can be remote from each other and have different capabilities. For example, a consumer may be running on a computing node (hereinafter "node") that operates faster than a node hosting a producer. In addition, network conditions can impact communications to/from the producer and/or the consumer. This environment allows the possibility of a consumer violating sequential access constraints of a file when a producer is writing to the file. This can lead to the consumer reading incorrect data. A file system can ensure compliance with serialization of a concurrently accessed file by obtaining a lock on a subsequent file range before releasing a currently held write lock.

20 Claims, 4 Drawing Sheets

CLUSTER SCALE SYNCHRONIZATION OF PRODUCER CONSUMER FILE ACCESS VIA MULTI-PROTOCOL NODES

BACKGROUND

This disclosure generally relates to the field of data processing, and, more particularly, to synchronizing producer consumer access to a shared resource in a cluster environment with multiple protocol nodes.

The classic producer-consumer problem involves a first process ("the producer") producing items (i.e., writing data) that are placed into a fixed size buffer and a second process ("the consumer") consuming items (i.e., reading) from the buffer. Since these processes work concurrently, solutions to the problem prevent the producer from producing an item when the buffer is full and prevent the consumer from trying to consume when the buffer is empty. If either case occurs, the other process may go into a wait state that creates noticeable delay.

SUMMARY

In a storage cluster, a producer and a consumer can be remote from each other and have different capabilities. For example, a consumer may be running on a computing node (hereinafter "node") that operates faster than a node hosting a producer. In addition, network conditions can impact communications to/from the producer and/or the consumer. This environment allows the possibility of a consumer violating sequential access constraints of a file when a producer is writing to the file. For instance, a consumer may be able to read a file range n and n+1 after a producer writes to the file range n but before the producer can acquire a lock on file range n+1. This can lead to the consumer reading incorrect data from the file range n+1. A file system can ensure compliance with serialization of a concurrently accessed file by obtaining a write lock for the producer on a subsequent file range before releasing a currently held write lock. A lock manager will condition lock release for file range n on acquisition of a lock on file range n+1. Since a consumer will not attempt to read file range n+1 until after reading file range n, the consumer will not be able to read file range n until the producer has already acquired the file range n+1 lock.

This summary is to be used as a brief summary for the disclosure, and not a comprehensive summary. The purpose of the brief summary is to provide a compact explanation that helps in understanding the disclosure. This brief summary does not capture the entire disclosure, and should not be used limit claim scope.

BRIEF DESCRIPTION OF THE DRAWINGS

The present embodiments may be better understood, and numerous objects, features, and advantages made apparent to those skilled in the art by referencing the accompanying drawings.

DESCRIPTION

The description that follows includes exemplary systems, methods, techniques, instruction sequences and computer program products that embody techniques of the present inventive subject matter. However, it is understood that the described embodiments may be practiced without these specific details. For instance, although examples refer to 1:1 producer-consumer synchronization, the claims are not so limited and apply to 1:n producer-consumer synchronization. In other instances, well-known instruction instances, protocols, structures and techniques have not been shown in detail in order not to obfuscate the description.

Introduction

In a record-oriented file system, a file is a sequential collection of records. The organization and formatting of a file can vary by file system. For example, a file can have a fixed length or variable length, padding, and various metadata. In terms of producer and consumer, a producer atomically produces each record of a file in sequence and consumers consume records in sequence. Producers and consumers are computing entities (e.g., a thread, process, processor, application, etc.). An item produced or consumed is a data item. In the context of this disclosure, a data item is a portion of a file. A portion of a file can vary in structure and moniker depending upon the file system/operating system. For example, a portion of a file may be referred to as a segment, block, record, range, etc. For ease of explanation, this description will refer to a file range instead of a portion of a file.

On a single computing node, a file system can use byte range locking to allow multiple processes to access a file. To prevent multiple processes from modifying a same range of a file, the file system grants an exclusive lock to a single producer. The file system grants a shared lock to consumers attempting to access unlocked file ranges. When a producer finishes writing to a locked file range, the producer releases the lock on the file range. This allows either another producer to obtain an exclusive lock on the file range for write access or a consumer to obtain a shared lock for read access.

Overview

In a storage cluster, a producer and a consumer can be remote from each other and have different capabilities. For example, a consumer may be running on a computing node (hereinafter "node") that operates faster than a node hosting a producer. In addition, network conditions can impact communications to/from the producer and/or the consumer. This environment allows the possibility of a consumer violating sequential access constraints of a file when a producer is writing to the file. For instance, a consumer may be able to read a file range n and n+1 after a producer writes to the file range n but before the producer can acquire a lock on file range n+1. This can lead to the consumer reading incorrect data from the file range n+1. A file system can ensure compliance with serialization of a concurrently accessed file by having a producer lock sequential file ranges. A producer will condition lock release for file range n on acquisition of a lock on file range n+1. Since a consumer will not attempt to read file range n+1 until after reading file range n, the consumer will not be able to read file range n until the producer has already acquired the file range n+1 lock.

Example Illustrations

Figure 1:
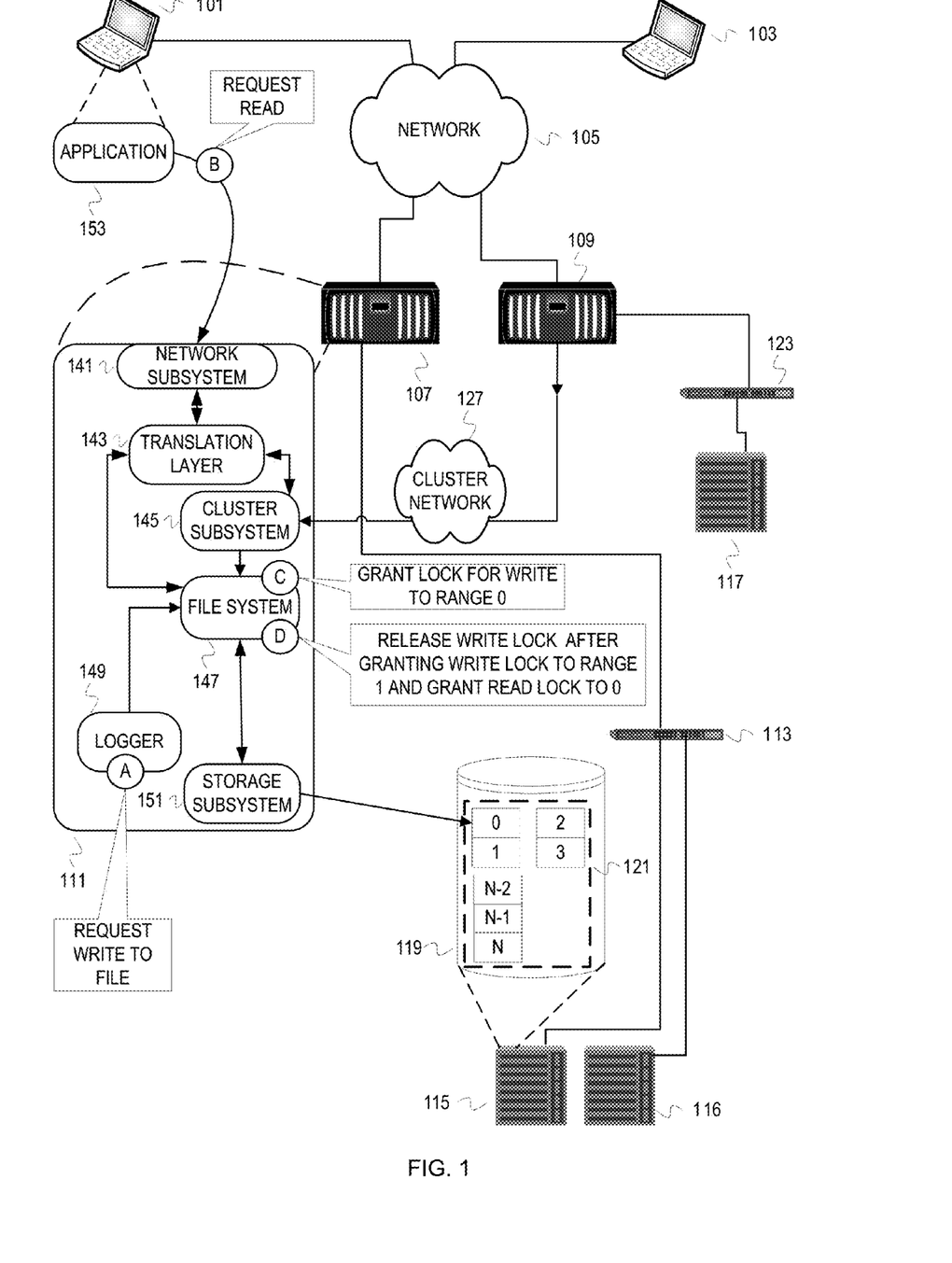
FIG. 1 depicts an example conceptual diagram of lock management of a multiple protocol node in a clustered storage environment.

FIG. 1 depicts an example conceptual diagram of lock management of a multiple protocol node in a clustered storage environment. A part of the clustered storage environment depicted in FIG. 1 includes a multiple protocol node 107, a multiple protocol node 109, storage arrays (also referred to herein as "storage backend") 115-117, a switch 113, a switch 123, and a cluster network 127. A logical data container 119 is hosted in the storage array 115. The logical data container 119 (e.g., a volume) includes a file 121. The file 121 is depicted as file ranges 0-N for this example illustration. FIG. 1 also depicts clients 101, 103 communicatively coupled with the clustered storage via a network 105.

An exploded view 111 depicts the subsystems/layers of the node 107. The node 107 hosts a network subsystem 141, a translation layer 143, a cluster subsystem 145, a file system instance ("file system") 147, and a storage subsystem 151. In addition, a logger 149 (e.g., a background process or daemon) is running on the node 107. There can be multiple instances of the network subsystem 141, the translation layer 143, and the storage subsystem 151. FIG. 1 only depicts a single instance of each to avoid unnecessary complexity. The network subsystem 141 is a collection of executing programs that implement multiple network related protocols, hence "multiple protocol node". The network subsystem 141 includes executing program code (and possibly hardware depending upon the protocol) for media access protocols, communication protocols, and file access protocols. Examples of the protocols implemented by the network subsystem 141 include the Ethernet protocol, the Fiber Distributed Data Interface (FDDI) protocol Gigabit Ethernet protocol, and the Asynchronous Transfer Mode (ATM) protocol. Examples of the communication protocols include the Internet Protocol (IP), the transmission control protocol (TCP), and the user datagram protocol (UDP). Examples of the file access protocols include the Network File System (NFS) protocol, the Common Internet File System (CIFS) protocol, the Server Message Block (SMB) protocol, and the Hypertext Transfer Protocol (HTTP). The file system 147 is a part of a file system that is hosted in the clustered storage environment. The file system 147 includes program code to manage locking file ranges. The storage subsystem 151 includes executing program code that implements the storage protocol and communication protocol(s) of the storage backend. The storage subsystem 151 can include program code for a redundant array of independent disks (RAID) manager, the small computer system interface (SCSI) standard(s), the Fibre Channel protocol, and a Fibre Channel Arbitrated Loop (FC-AL). The translation layer 143 translates requests from the network subsystem 141 for consumption by the storage subsystem 151. As an example, the network subsystem 141 can include an endpoint for a CIFS connection and the storage subsystem can include a RAID manager. The translation layer 143 would translate a CIFS file access request into one or more file access operations that can be passed to the file system 147. The translation layer 143 can also be considered a protocol switching layer (i.e., executing program code(s) that switches commands/requests/messages between protocols). The file system 147 then interacts with the storage subsystem 151 to carry out the translated file access operations in the storage backend. The translation layer 143 may also pass translated requests to the cluster subsystem 145 instead of the filesystem 147. If the request is for data that is managed/hosted remotely (e.g., by the node 109), then the translated request will flow from the translation layer 143 through the cluster subsystem 145 to a corresponding cluster subsystem (not depicted) on the node 109.

FIG. 1 is annotated with a series of letters, A-D. These letters represent stages of operations. Although these stages are ordered for this example, the stages illustrate one example to aid in understanding this disclosure and should not be used to limit the claims. Claimed subject matter can vary with respect to the order and some of the operations.

At stage A, a logger 149 submits a file write request to the file system 147. The logger 149 writes to a log (i.e., a log file) for the node 107. The logger 149 logs events and operations in accordance with logging configurations of the node 107. For this illustration, the logger 149 is a producer.

At a stage B, an application 153 at the client 101 generates a read request. For instance, the application 153 may be an auditing application or administrative console on the client 101. The application may submit an NFS or CIFS read request. For this illustration, the application 153 is a consumer. The read request travels through the network 105 to the node 107. At the node 107, the read request is received at an interface (e.g., logical interface or virtual interface) of the network subsystem 141. The network subsystem 141 decapsulates the read request from the media access protocol(s) and communication protocol(s) used to carry the request over the network 105. The network subsystem 141 then passes the read request to the translation layer 143. Either the translation layer 143 or the network subsystem 141 (or another module/subsystem) accesses a database to determine that the read request targets a logical container in a storage array managed by the node 107. If the node 109 had received the read request instead of the node 107, then the node 109 would have forwarded the read request to the node 107 via its own cluster subsystem. If the logical container was managed by the node 109, then the read request would be forwarded to the node 109 via the cluster subsystem 145 after translation. The translation layer 143 translates the read request into a read request that can be processed by the file system 147.

At stage C, the file system grants a lock on a range for the write request from the logger 149. This presumes that the file system 149 received the write request prior to the read request from the application 153. The write request from the logger 149 will identify the logger (e.g., process identifier and node identifier), the file (e.g., volume and file handle), the file range to be written (e.g., offset and length), and type of request (i.e., write). This request may create a write lock request as a side effect. Or the logger 149 may request the write lock prior to sending the write request. When granted, the file system records indications of the write lock, file, range, and requestor. After grant of the lock, the file system 147 passes the logger's write request to the storage subsystem 151 for fulfillment.

At stage D, the file system 147 releases the write lock after granting a write lock to the next file range of the file 121 to the logger 149. The logger 149 will likely continue writing to the file 121. Instead of locking the entire file, locking ranges allows a producer to continue writing to a file while allowing consumers to read those parts of the file already written to by the producer. Thus, the logger 149 will send to the file system 147 subsequent request to write to successive ranges of the file 121. When a write request is fulfilled by the storage subsystem 151, the storage subsystem will notify the file system 147. The file system 147 will notify the logger 149. The logger 149 will then send the next write request or batch of write requests. During this period, the logger 149 still holds a write lock on the file range that has already been written to. After the file system 147 grants to the logger 149 a write lock on the range (e.g., range 1) indicated in the subsequent write request, the file system 147 will release the write lock on the file range 0.

After release of the write lock on the file range 0, the file system 147 grants a read lock to the application 153 on the file range 0. The read lock is also referred to as a shared lock because it allows other consumers to read the read locked file range. The read lock prevents grant of a write lock. If the application 153 supports the range locks, then the file system 147 will notify the network subsystem 141 that the read lock is granted and the network subsystem 141 will in turn notify the application 153. The file system 147 can determine whether the application 153 supports range locking because the translation layer 143 will record information about the request that was received from the network subsystem 141, and pass that information on to the file system 147. For example, the translation layer 143 may record that the request was originally a CIFS request or NFS request. If the original request was in accordance with a protocol that does not support range locking, then the file system 147 will manage the locking without notifying the requestor.

Although FIG. 1 describes a file system instance as managing range locking, the disclosure is not so limited. Managing file range locking for synchronizing producer-consumer access to a file on a multiple protocol node can be separate from the file system or be an extension to the file system. The disclosure will refer to a module, program code, etc. that performs this range lock management as a lock manager.

Figure 2:
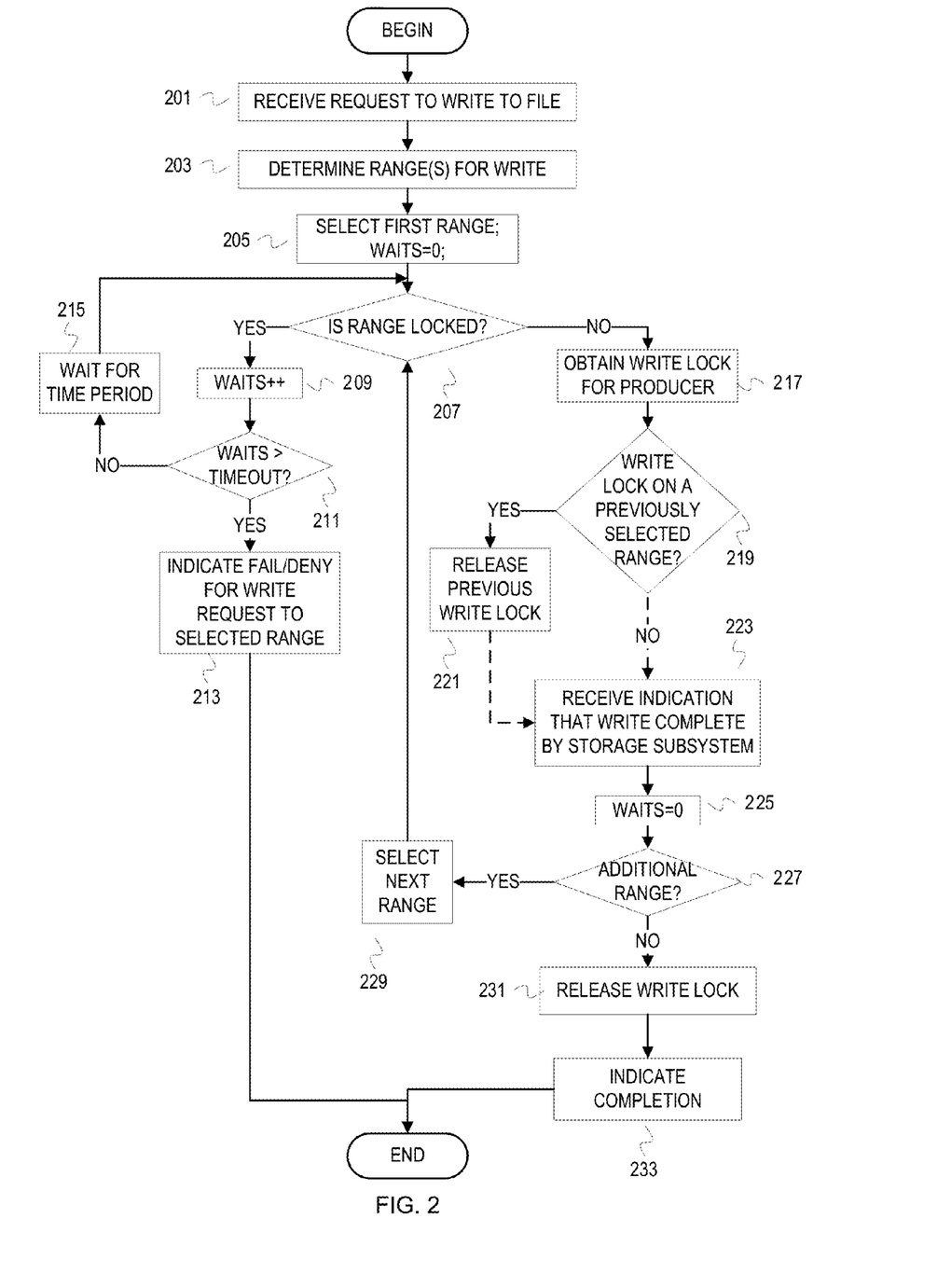
FIG. 2 is a flowchart of example operations for managing locking ranges of files for writing by a producer.

FIG. 2 is a flowchart of example operations for managing locking ranges of files for writing by a producer. For continuity of this description, the example operations are described as if performed by a lock manager. Dashed lines in any of the flow charts indicate an asynchronous transition (e.g., receipt of a response causes the flow).

At block 201, the lock manager receives a request to write to a file. If the request originated external to the multiple protocol node hosting the lock manager, then the request is a translated request. The lock manager will also receive data that indicates a protocol of the original request as well as a producer (e.g., network address and port identifying the producer). The lock manager may operate without information about the original producer and operate as if the request originated from the translation layer or a cluster subsystem. In that case, the intermediate producer (e.g., translation layer or cluster subsystem) tracks whether additional notifications are to be generated for the original producer depending upon the producer's protocol(s). Despite the possible variations in architecture of the multiple protocol node, the request received by the lock manager will indicate a producer. The request will also indicate a file that is the target of the request. If the protocol of the original request supports range locking, then the request will also indicate an offset and a length. The request can indicate multiple ranges of a file for writing. For example, the request can include an array of ranges as an argument or parameter.

At block 203, the lock manager determines a range(s) for the write. The range to be written may not align to a range that can be locked by the lock manager. For instance, the lock manager may be limited to locking ranges of 64 bytes and a write request may indicate a range of 128 bytes. The lock manager would then determine that 2 ranges are to be locked.

At block 205, the lock manager selects a first range of the determined ranges and initializes a wait counter to 0. The wait counter is used to count a number of times the lock manager waits for a lock to be released.

At block 207, the lock manager determines whether the selected range is locked. The lock manager accesses a data structure, map, or database that indicates what ranges of a file are locked. The lock manager determines whether the selected range overlaps with any of the ranges indicated as locked. Since the lock to be granted is a write lock, no locks can exist on an overlapping range. If there is overlap between the selected range and an already locked range, then control flows to block 209. Otherwise, control flows to block 217.

At block 209, the wait counter is incremented.

At block 211, the lock manager determines whether the wait counter exceeds a timeout threshold. This is a configured and/or default threshold set to prevent prolonged waiting. If the threshold is not exceeded, then control flows to block 215. If the threshold is exceeded, then control flows to block 213.

At block 213, the lock manager indicates a fail/deny for the write request to the selected range. This fail/deny indication is supplied back to the source of the request if the producer is local. Otherwise, the fail/deny indication flows back through the translation layer to the network subsystem before eventually returning to the producer. The process ends after block 213.

At block 215, the lock manager waits for a time period. The lock manager does not enter a suspended state or wait state. The lock manager can process other requests. The lock manager initiates a timer for the request or producer. The timer can notify the lock manager (e.g., set a flag associated with the request or producer) when the time period expires. Control returns to block 207 from block 215.

If there was no determined range overlap at block 207, then the lock manager obtains a write lock for the producer at block 217. Since the lock manager is on a multiple protocol node, the lock manager may record producer identifying information that is local information (e.g., process identifier) or layered information (e.g., network address and port of producer at a client, network subsystem instance, logical interface, translation layer instance, etc.). The lock manager can also set a value that distinguishes the lock as a write lock.

At block 219, the lock manager determines whether the producer currently has a write lock on a previously selected range. The lock manager can examine the write locks on the file and determine whether a preceding range has a write lock that indicates the producer. If so, then control flows to block 221. If not, then control flows to block 223.

At block 221, the lock manager releases that write lock on the previous file range. Control flows from block 221 to block 223.

At block 223, the lock manager receives an indication(s) that the write was completed by the storage subsystem. For instance, the storage subsystem provides acknowledgement of the write to a file system. The file system then indicates the successful write to the lock manager. Of course, the storage system may not successfully complete the write. The lock manager can implement a variety of time out mechanisms to release locks when a write fails.

At block 225, the lock manager resets the wait counter to 0. As previously mentioned, the wait counter counts a number of waits for a lock on a file range.

At block 227, the lock manager determines whether there is an additional range for the write request. If there is, then control flows to block 229. If there is not, then control flows to block 231.

At block 229, the lock manager selects a next range of the write request. The lock manager may select a next range of an array of ranges indicated in a write request. The lock manager may itself define the next range. The write request may request a write to a range of the file that is larger than allowed to be locked by the lock manager. Assume the write request indicates a write to a file offset of 12 kilobytes (KB) and a length of 800 KB. The lock manager may limit a write lock to a range of 100 kilobytes. The initial range will be defined by offset 12 KB and length 100 KB. The next range to be locked will be defined by offset 112 KB and length 100 KB. Thus, the lock manager will check for an overlap with the range defined by offset 112 KB and length 100 KB. As another example, the write request may be a create file request. Using the same limit of 100 KB for a lock range, the lock manager would sequentially obtain write locks in 100 KB ranges starting from offset 0 (or offset beyond a file header).

The lock manager releases a currently held write lock at block 231 if there was no additional range at block 227.

At block 233, the lock manager indicates completion of the write to the producer, or to an intermediary for the producer (e.g., translation layer, cluster subsystem, etc.). The process ends after block 233.

Figure 3:
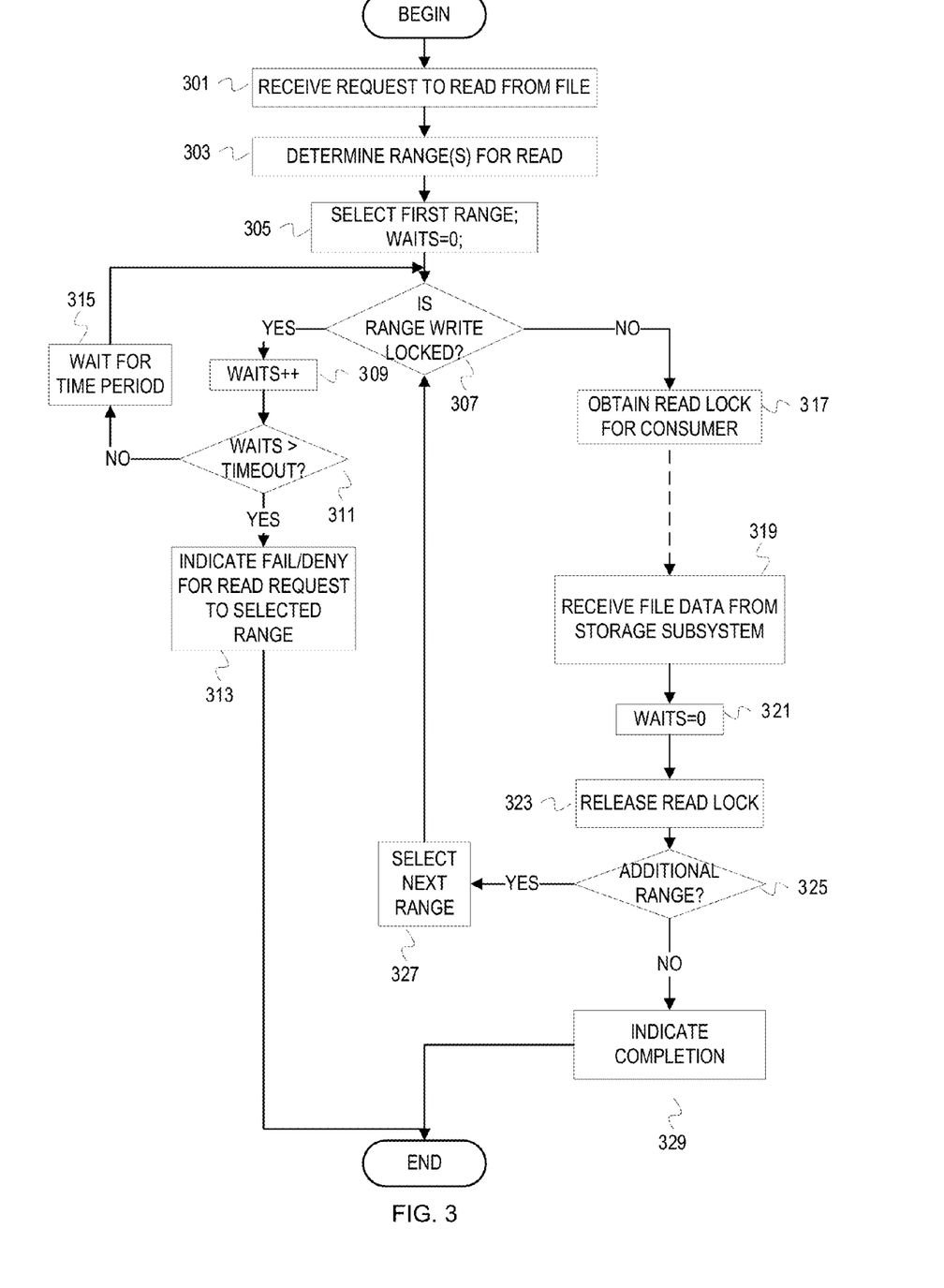
FIG. 3 is a flowchart of example operations for managing locking ranges of files for reading by a consumer.

FIG. 3 is a flowchart of example operations for managing locking ranges of files for reading by a consumer. For continuity of this description, the example operations are described as if performed by a lock manager. Dashed lines in any of the flow charts indicate an asynchronous transition (e.g., receipt of a response causes the flow).

At block 301, the lock manager receives a request to read a file. If the request originated external to the multiple protocol node hosting the lock manager, then the request is a translated request. The lock manager will also receive data that indicates a protocol of the original request as well as a consumer (e.g., network address and port identifying the consumer). The lock manager may operate without information about the original consumer and operate as if the request originated from the translation layer or a cluster subsystem. In that case, the intermediate consumer (e.g., translation layer or cluster subsystem) tracks whether additional notifications are to be generated for the original consumer depending upon the consumer's protocol(s). Despite the possible variations in architecture of the multiple protocol node, the request received by the lock manager will indicate a consumer. The request will also indicate a file that is the target of the request. If the protocol of the original request supports range locking, then the request will also indicate an offset and a length. The request can indicate multiple ranges of a file for writing. For example, the request can include an array of ranges as an argument or parameter.

At block 303, the lock manager determines a range(s) for the read. The range to be read may not align to a range that can be locked by the lock manager. For instance, the lock manager may be limited to locking ranges of 64 bytes and a read request may indicate a range of 128 bytes. The lock manager would then determine that 2 ranges are to be locked.

At block 305, the lock manager selects a first range of the determined ranges and initializes a wait counter to 0. The wait counter is used to count a number of times the lock manager waits for a lock to be released.

At block 307, the lock manager determines whether the selected range is locked. The lock manager accesses a data structure, map, or database that indicates what ranges of a file are write locked. The lock manager determines whether the selected range overlaps with any of the ranges indicated as write locked. Since the lock to be granted is a read lock, other read locks can exist on an overlapping range. If there is overlap between the selected range and a write locked range, then control flows to block 309. Otherwise, control flows to block 317.

At block 309, the wait counter is incremented.

At block 311, the lock manager determines whether the wait counter exceeds a timeout threshold. This is a configured and/or default threshold set to prevent prolonged waiting. If the threshold is not exceeded, then control flows to block 315. If the threshold is exceeded, then control flows to block 313.

At block 313, the lock manager indicates a fail/deny for the read request on the selected range. This fail/deny indication is supplied back to the source of the request if the consumer is local. Otherwise, the fail/deny indication flows back through the translation layer to the network subsystem before eventually being supplied to the consumer that requested the read. The process ends after block 313.

At block 315, the lock manager waits for a time period. The lock manager does not enter a suspended state or wait state. The lock manager can process other requests. The lock manager initiates a timer for the request or consumer. The timer can notify the lock manager (e.g., set a flag associated with the request or consumer) when the time period expires. Control returns to block 307 from block 315.

If there was no determined range overlap with a write locked range at block 307, then the lock manager obtains a read lock for the consumer at block 317. Since the lock manager is on a multiple protocol node, the lock manager may record consumer identifying information that is local information (e.g., process identifier) or layered information (e.g., network address and port of producer at a client, network subsystem instance, logical interface, translation layer instance, etc.). The lock manager can also set a value that distinguishes the lock as a read lock.

At block 319, the lock manager receives file data of the read file range from the storage subsystem. As with a write, the storage system may not successfully complete the read (i.e., may not return the file data). The lock manager can implement a variety of time out mechanisms and/or retries to release or retain locks when a read fails.

At block 321, the lock manager resets the wait counter to 0.

At block 323, the lock manager releases the read lock. This allows any waiting producer to obtain a write lock on a range that overlaps with the read range.

At block 325, the lock manager determines whether there is an additional range for the read request. If there is, then control flows to block 327. If there is not, then control flows to block 329.

At block 327, the lock manager selects a next range of the read request. This can be similar to block 229 of FIG. 2.

At block 329, the lock manager indicates completion of the read to the consumer, or to an intermediary for the consumer (e.g., translation layer, cluster subsystem, etc.). The process ends after block 329.

The flowcharts are provided to aid in understanding the illustrations and are not to be used to limit scope of the claims. The flowcharts depict example operations that can vary among aspects of the disclosure. Additional operations may be performed; fewer operations may be performed; the operations may be performed in parallel; and the operations may be performed in a different order. For example, the operation depicted in block 225 of FIG. 2 can be performed at after block 217. A lock manager may not use a counting mechanism for waits on locks. The lock manager may notify a requestor of a deny or fail if a requested range overlaps with a locked range without any retry.

Although the example illustrations refer to a metadata object, generation of a metadata object is not necessary. A backup tool can determine whether a last data object has sufficient remaining space to accommodate the metadata for the object set. If so, then the backup tool can record the metadata into a demarcated part of the last data object. The backup tool can also indicate in the name of the data object that the data object also contains metadata for the object set.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a standalone machine, may execute in a distributed manner across multiple machines, and may execute on one machine while providing results and or accepting input on another machine.

Aspects of this disclosure are described with reference to flowchart illustrations and/or block diagrams. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 4:
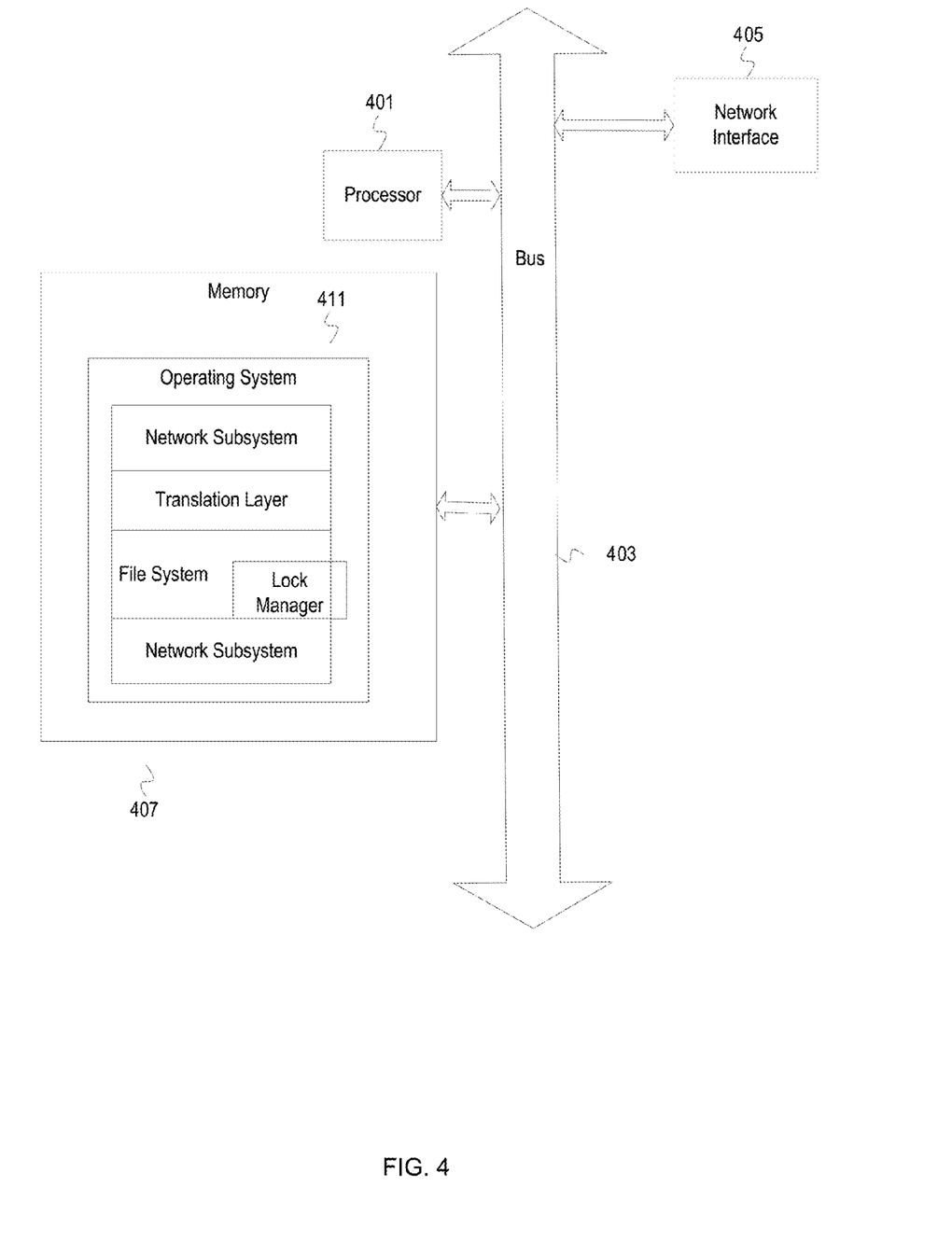
FIG. 4 depicts an example computer system with a lock manager to enforce serialization between producer and consumer of a file.

FIG. 4 depicts an example computer system with a lock manager to enforce serialization between producer and consumer of a file. The computer system includes a processor unit 401 (possibly including multiple processors, multiple cores, multiple nodes, and/or implementing multithreading, etc.). The computer system includes memory 407. The memory 407 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 403 (e.g., PCI, ISA, PCI-Express, HyperTransport® bus, InfiniBand® bus, NuBus, etc.) and a network interface 405 (e.g., a Fiber Channel interface, an Ethernet interface, an internet small computer system interface, SONET interface, wireless interface, etc.). The memory 407 is depicted as hosting an operating system 411. The operating system 411 includes some of the modules depicted in FIG. 1. The operating system 411 includes a network subsystem, a translation layer, a file system, and a network subsystem. A lock manager is depicted as partially overlapping with the file system. This overlapping illustrates that the lock manager can be part of the file system or an extension of the file system. The lock manager performs the already described functionalities for ensuring serialization of producers and consumers accessing a file in a clustered storage environment. Realizations may include fewer or additional components not illustrated in FIG. 4 (e.g., video cards, audio cards, additional network interfaces, peripheral devices, etc.). The processor unit 401 and the network interface 405 are coupled to the bus 403. Although illustrated as being coupled to the bus 403, the memory 407 may be coupled to the processor unit 401.

While the embodiments of the disclosure are described with reference to various implementations and exploitations, it will be understood that these embodiments are illustrative and that the scope of the claims is not limited to them. In general, techniques for serializing producer consumer access to a file in a clustered storage environment as described herein may be implemented with facilities consistent with any hardware system or hardware systems. Many variations, modifications, additions, and improvements are possible.

Plural instances may be provided for components, operations or structures described herein as a single instance.

Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

This disclosure uses the term node to refer to any computing device that can carry out the described functionality. A node may be a portable computer, wearable device, standalone computer, a card or drawer in a rack, a node in a grid, etc.

Use of the phrase "at least one of . . . or" should not be construed to be exclusive. For instance, the phrase "X comprises at least one of A, B, or C" does not mean that X comprises only one of {A, B, C}; it does not mean that X comprises only one instance of each of {A, B, C}, even if any one of {A, B, C} is a category or sub-category; and it does not mean that an additional element cannot be added to the non-exclusive set (i.e., X can comprise {A, B, Z}).

What is claimed is:

1. A method comprising:
   obtaining a write lock for a first computing entity on a first range of a file in response to a first request to write to the file from the first computing entity and after determining that the first range is not locked, wherein the file is hosted in a storage cluster;
   determining a second range of the file to be written for the first computing entity;
   obtaining a write lock for the first computing entity on the second range after determining that the first computing entity will write to the second range and before releasing the write lock on the first range;
   preventing a second computing entity, which runs on a different computing node than the first computing entity, from reading a third range of the file that at least partially overlaps with either the first range or the second range while the first computing entity has the write locks on both the first and second ranges; and
   obtaining a shared lock for the second computing entity for reading the third range after obtaining the first computing entity the write lock on the second range and releasing the write lock on the first range.

2. The method of claim 1 further comprising translating a second request into the first request, wherein the second request was received from a client accessing the storage cluster.

3. The method of claim 2, wherein translating the second request into the first request comprises translating a file access protocol request into a local file system operation.

4. The method of claim 1, wherein the write lock is an exclusive byte range lock and the read lock is a shared byte range lock.

5. The method of claim 1 further comprising preventing a third computing entity from obtaining a second write lock on a fourth range of the file that at least partially overlaps with the either the first range or the second range of the file.

6. The method of claim 1, wherein the second range is indicated in either the first request or a third request, wherein the third request requests writing by the first computing entity to the second range.

7. One or more non-transitory machine-readable media having program code stored therein, the program code comprising program code to:
   obtain a write lock for a first computing entity on a first range of a file in response to a first request to write to the file from the first computing entity and after determining that the first range is not locked, wherein the file is hosted in a storage cluster;
   determine a second range of the file to be written for the first computing entity;
   obtain a write lock for the first computing entity on the second range after a determination that the first computing entity will write to the second range and before release of the write lock on the first range;
   prevent a second computing entity, which runs on a different computing node than the first computing entity, from reading a third range of the file that at least partially overlaps with either the first range or the second range while the first computing entity has the write locks on both the first and second ranges; and
   obtain a shared lock for the second computing entity for reading the third range after obtaining of the write lock on the second range for the first computing entity and release of the write lock on the first range.

8. The one or more non-transitory machine-readable media of claim 7 further having stored therein program code to translate a second request into the first request, wherein the second request was received from a client accessing the storage cluster.

9. The one or more non-transitory machine-readable media of claim 8, wherein the program code to translate the second request into the first request comprises program code to translate a file access protocol request into a local file system operation.

10. The one or more non-transitory machine-readable media of claim 7, wherein the write lock is an exclusive byte range lock and the read lock is a shared byte range lock.

11. The one or more non-transitory machine-readable media of claim 7 further having stored therein program code to prevent a third computing entity from obtaining a second write lock on a fourth range of the file that at least partially overlaps with the either the first range or the second range of the file.

12. The one or more non-transitory machine-readable media of claim 7, wherein the second range is indicated in either the first request or a third request, wherein the third request requests writing by the first computing entity to the second range.

13. The one or more non-transitory machine-readable media of claim 7, wherein the third range is the same as either the first range or the second range.

14. The one or more non-transitory machine-readable media of claim 7, further having stored therein program code to release the write lock on the first range after obtaining of the write lock on the second range for the first computing entity.

15. An apparatus comprising:
   a processor;
   a network interface; and
   a machine readable medium having program code stored therein, the program code executable by the processor to cause the apparatus to,
   obtain a write lock for a first computing entity on a first range of a file in response to a first request to write to the file from the first computing entity and after determining that the first range is not locked, wherein the file is hosted in a storage cluster;

determine a second range of the file to be written for the first computing entity;

obtain a write lock for the first computing entity on the second range after a determination that the first computing entity will write to the second range and before release of the write lock on the first range;

prevent a second computing entity, which runs on a different computing node than the first computing entity, from reading a third range of the file that at least partially overlaps with either the first range or the second range while the first computing entity has the write locks on both the first and second ranges; and obtain a shared lock for the second computing entity for reading the third range after obtaining of the write lock on the second range for the first computing entity and release of the write lock on the first range.

16. The apparatus of claim 15, wherein the machine readable medium further has stored therein program code to translate a second request into the first request, wherein the second request was received from a client accessing the storage cluster.

17. The apparatus of claim 16, wherein the program code to translate the second request into the first request comprises program code to translate a file access protocol request into a local file system operation.

18. The apparatus of claim 15, wherein the machine readable medium further has stored therein program code to prevent a third computing entity from obtaining a second write lock on a fourth range of the file that at least partially overlaps with the either the first range or the second range of the file.

19. The apparatus of claim 15, wherein the second range is indicated in either the first request or a third request, wherein the third request requests writing by the first computing entity to the second range.

20. The apparatus of claim 15, wherein the machine readable medium further has stored therein program code to release the write lock on the first range after obtaining of the write lock on the second range for the first computing entity.

* * * * *